A. SCHULTZ.
FEED BAG.
APPLICATION FILED DEC. 8, 1911.
1,029,148.
Patented June 11, 1912.
2 SHEETS—SHEET 2.
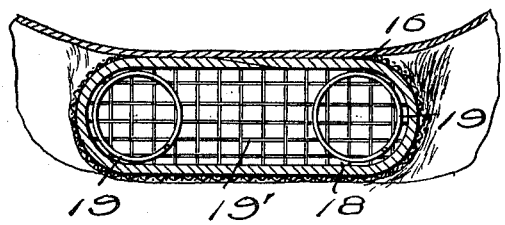
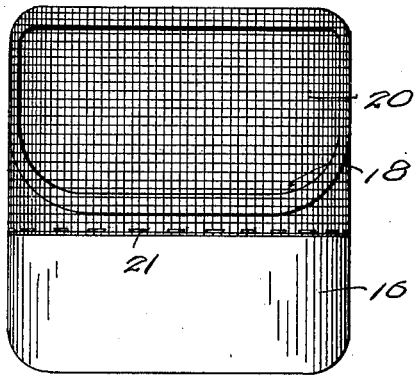
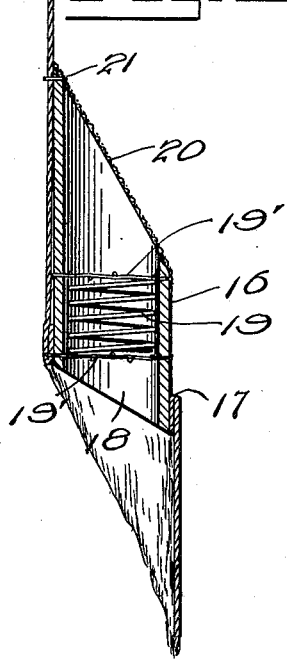
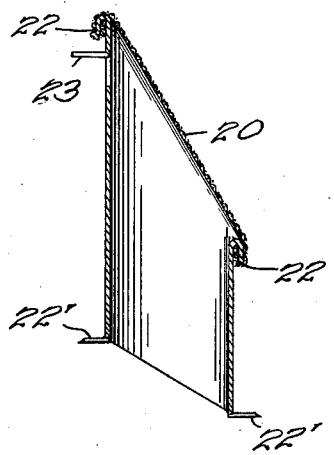
Inventor
A. Schultz,
By H L Woodward
Attorney
Witnesses

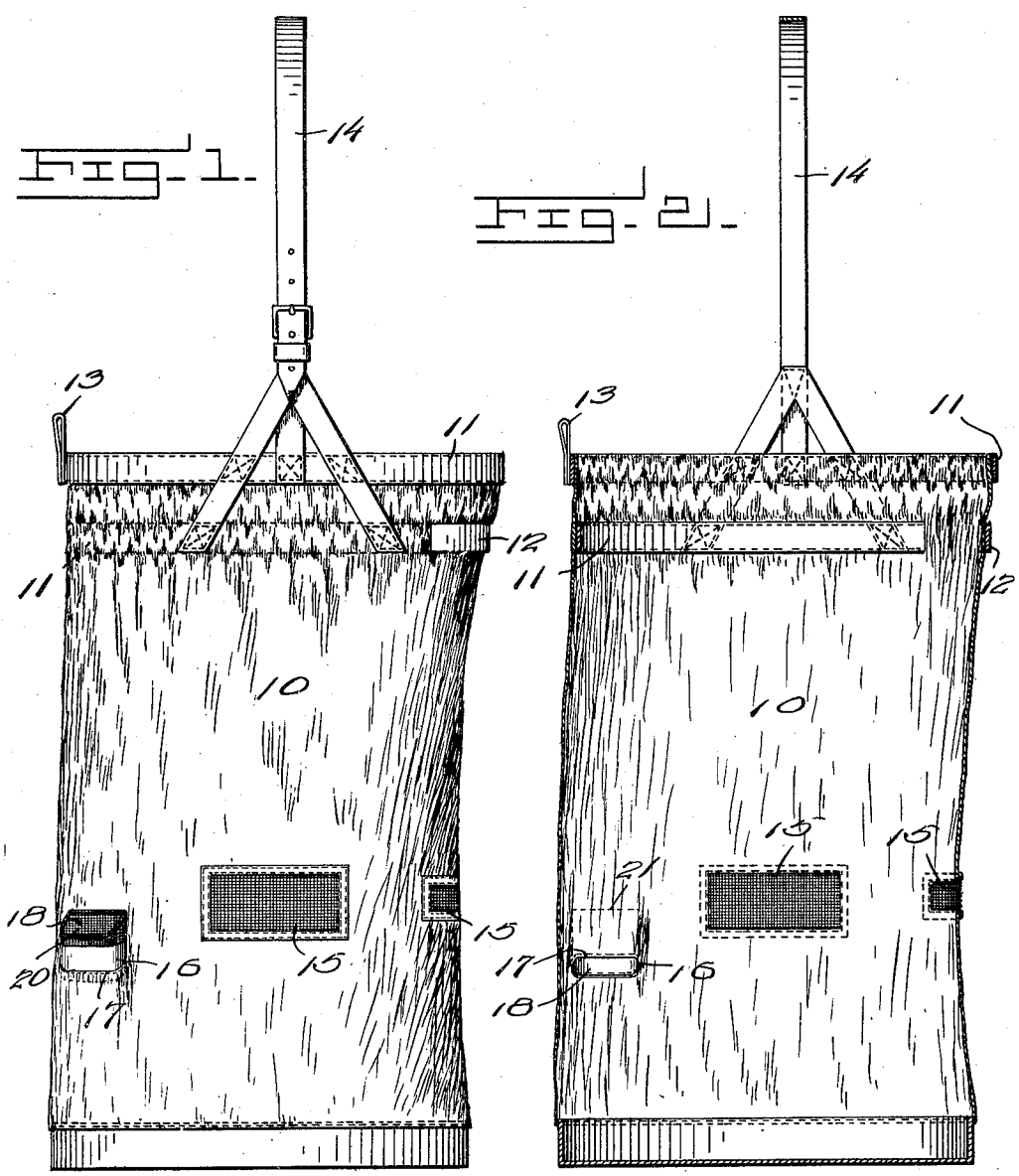

UNITED STATES PATENT OFFICE.

AUGUST SCHULTZ, OF SAN DIEGO, CALIFORNIA.

FEED-BAG.

1,029,148.

Specification of Letters Patent. Patented June 11, 1912.

Application filed December 8, 1911. Serial No. 664,614.

*To all whom it may concern:*

Be it known that I, AUGUST SCHULTZ, a citizen of the United States, residing at San Diego, in the county of San Diego and State of California, have invented new and useful Improvements in Feed-Bags, of which the following is a specification.

This invention relates to feed bags for horses, and has for its object to provide means for effectively ventilating such a bag while the upper or open end is fitted tightly over the face and jaws of an animal, and which will not be liable to become choked by feed in the bag.

It is an important object to provide such a device that the feed in the bag can not become banked against the screen so that the interstices become filled.

It is an important object to enable the use of a ventilator supplying air to points near the bottom of the bag convenient to the respective nostrils of the animal being fed and so arranged that even should the grain bran or other material become banked over the opening through which air enters the feed space it will not become clogged, nor will grain be wasted when the animal tosses its head.

A most important object is to provide a construction whereby the air inlet can not be closed by being pressed against the face of the animal.

Another important object is to enable the manufacture of the device economically.

Other objects and advantages will be apparent from the following description and from the drawings in which—

Figure 1 is a side view of the bag, Fig. 2 is a vertical sectional view thereof, Fig. 3 is a horizontal section through the bag, Fig. 4 is a detail elevation of the ventilator, Fig. 5 is a detail section of the ventilator, Fig. 6 is a detail section of a modified form of ventilator There is illustrated a bag 10 approximately the same in form as those customarily used except that it is flared at the rear side to accommodate the cheek bones of a horse snugly. The upper portion of the bag is gathered somewhat and held yieldably to a reduced diameter by means of two parallel bands of elastic 11, whereby a broad area of the bag surface is held against the cheeks of the horse to prevent the escape of grain upwardly through the bag when the animal tosses its head. A loop of the elastic is formed at 12 by leaving a portion unattached at the rear side of the bag which may serve as a handle in lifting the bag, and at the forward side a loop 13 is attached for similar use; and these loops may also receive portions of the bridle or other straps, for its support. A suitable supporting strap 14 is attached by opposite ends to respective sides of the bag in a suitable manner, the strap 14 being intended to slip over the animal's head as a main support for the bag in the manner already familiar, in prior devices.

Ventilating openings 15 of ordinary form may be formed in the sides of the bag at proper points and covered with suitable screens but these are open to the usual objections, which this invention is designed to overcome, and therefore at the forward side of the bag spaced suitable for registration with the nostrils of an animal, there are located my special ventilators at 16.

Suitable horizontal oblong openings 17 are formed in the wall of the bag into which are secured the lower ends of transversely ovate ducts 18 formed of leather or other suitable stiff or semi-rigid material extending some distance outwardly from the point of attachment. The ducts are longitudinally rectilinear and rigid in construction, and after attachment are forced into vertical position against the side of the bag, to which they are attached at their upper ends. The lower edge of each duct is disposed in a plane inclined downwardly from the interior toward the exterior of the bag, and the outer end is similarly formed, in a plane parallel to that of the lower edge, or it may be more nearly parallel to the side of the bag, whereby no abrupt projection is presented either on the inside or the outside of the bag. By the inward turning of the duct after securement to the bag, one edge is spaced inwardly of the other, whereby the opening at the lower end is prevented from being closed by fitting flatly against the surface of an animal's cheek, and the portion of the bag below the duct is held outwardly whereby a considerable space is assured below and also a little on each side thereof and air will have free passage to the nostrils of an animal when pressed close to the bag below the ducts, or when disposed adjacent thereto. To prevent the ducts from being compressed and shut off in case an animal should bear them forcibly against some exterior object with its nose, the duct being compressed therebetween, helical springs 19 are secured in the ducts, one at each side, secured by a plurality of wires 19, in the form of a coarse screen the strands engaged through the sides of the ducts, and serving to prevent corn or other large grain from entering and being wedged in the ducts around the springs. Smaller grain may pass through this screen without likelihood of clogging the duct. The springs are confined between two such screens, under compression tending to stretch the ducts to their fullest length, at the same time that they prevent the inward yielding of the sides. The springs are fitted snugly into the opposite rounded sides of the ducts so that they are held in proper shape. An outer fine mesh screen 20 is engaged over the outer ends of the ducts, being held thereto by the securing means 21 by which the upper ends of the ducts are attached to the bag 10, and by certain of the wires used in the securement of the springs. The securing means 21, may be in the form of stitched thread, or rivets or staples, or other suitable means. The outer screen may be attached to the duct by other means if desired, and there is illustrated in Fig. 6 a modified form of attaching means which includes an oval sheet metal frame adapted to receive the screen thereupon cut to fit, an upwardly projecting flange 22 being curved inwardly and downwardly upon the screen holding it clamped securely in place. Suitable prongs 22 project from the lower part of the frame which are engaged in the material of the duct, and at the rear side barbs 23 are provided to be engaged with the bag to hold the duct thereagainst. The inclination of the lower edge plane of the ducts may be done away with entirely and the ends cut off square with the longitudinal axes of the ducts as indicated in dotted lines in Fig. 2. By this means backing up of grain into the ducts will be lessened. It will be seen that if the animal being fed, in nosing in the grain heaps it up over the inner ends of the ducts, by reason of its limited fluidity it will not rise in the ducts to any great extent, and thus the screen 20 will be protected from fouling. Also, when the animal tosses its head entrance of grain to the ducts will be obstructed by the coarse screens so that but rarely will the feed contents reach the screen 20.

By reason of the close proximity of the ducts to the nostrils of the animal, the major portion of the bag may be full of dust while comparatively pure air passes directly from the ducts to the nostrils without carrying dust from other parts of the bag. For the full attainment of this advantage, there should not, of course, be other vent openings than the ducts, and the openings 15 shown may be dispensed with, being merely shown to indicate that they may be used if it be found desirable to ventilate the rear portion of the bag, which might make it cooler for the animal.

What is claimed is:

1. A nosebag comprising a receptacle having openings therethrough convenient to the nostrils of the head of an animal engaged therein, a duct element engaged in each opening and extending outwardly therefrom, the outer portion of the ducts being secured against the bag above the openings, whereby the portion of bag therebeneath is offset outwardly, for the purpose described, and a screen at the outer end of the duct.

2. In a nosebag, a ventilator comprising a vertical duct element of flexible material, secured by its lower end in the bag a helical spring bracing element therein, and a screen at its upper end.

In testimony whereof I have hereunto set my hand in presence of two subscribing witnesses.

AUGUST SCHULTZ.

Witnesses:
 MAX MEISSNER,
 C. MEISSNER.

---

Copies of this patent may be obtained for five cents each, by addressing the "Commissioner of Patents, Washington, D. C."